(12) United States Patent
Ozeki et al.

(10) Patent No.: US 11,898,985 B2
(45) Date of Patent: Feb. 13, 2024

(54) METAL STRUCTURE EVALUATOR FOR ROLLED STEEL SHEETS, METHOD FOR EVALUATING METAL STRUCTURE OF ROLLED STEEL SHEET, PRODUCTION FACILITY OF STEEL PRODUCT, METHOD FOR MANUFACTURING STEEL PRODUCT, AND METHOD OF QUALITY MANAGEMENT OF STEEL PRODUCT

(71) Applicant: JFE STEEL CORPORATION, Tokyo (JP)

(72) Inventors: Takafumi Ozeki, Tokyo (JP); Yutaka Matsui, Tokyo (JP); Kenji Adachi, Tokyo (JP); Junji Shimamura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 122 days.

(21) Appl. No.: 17/605,490

(22) PCT Filed: Apr. 17, 2020

(86) PCT No.: PCT/JP2020/016877
§ 371 (c)(1),
(2) Date: Oct. 21, 2021

(87) PCT Pub. No.: WO2020/218192
PCT Pub. Date: Oct. 29, 2020

(65) Prior Publication Data
US 2022/0205950 A1    Jun. 30, 2022

(30) Foreign Application Priority Data

Apr. 22, 2019 (JP) ................. 2019-080845

(51) Int. Cl.
*G01N 27/87* (2006.01)
*B21B 1/22* (2006.01)

(52) U.S. Cl.
CPC ............ *G01N 27/87* (2013.01); *B21B 1/22* (2013.01)

(58) Field of Classification Search
CPC ........ G01N 27/72; G01N 27/82; G01N 27/87; G01N 27/90; G01N 27/9006;
(Continued)

(56) References Cited

U.S. PATENT DOCUMENTS 5,306,356 A    4/1994 Brissonneau et al.

FOREIGN PATENT DOCUMENTS

JP    H01-269049 A    10/1989
JP    H03-024251 A    2/1991
(Continued)

OTHER PUBLICATIONS

Toshiyuki et al.; Translation of JP H07318535 A; Dec. 8, 1995; Translated by EPO & Google (Year: 1995).*
(Continued)

*Primary Examiner* — Steven L Yeninas
*Assistant Examiner* — Rahul Maini
(74) *Attorney, Agent, or Firm* — Oliff PLC

(57) ABSTRACT

A metal structure evaluator for rolled steel sheets includes: a magnetic property measuring unit configured to measure a magnetic property of an evaluation target point in at least two or more different magnetization directions by performing, in the at least two or more different magnetization directions, processing of: applying a magnetic field on a surface of a rolled steel sheet in one direction; and measuring a magnetic property of the evaluation target point on the surface of the rolled steel sheet; and a determination unit configured to determine a metal structure of the evaluation
(Continued)

target point based on the magnetic property measured by the magnetic property measuring unit.

7 Claims, 8 Drawing Sheets

(58) Field of Classification Search
CPC ............. G01N 27/9013; G01N 27/902; G01N 27/9026; G01N 27/904; G01N 27/9046; G01N 27/9053; G01N 27/9703; G01N 27/908; G01N 27/9093; G01N 33/2045; B21B 1/22
USPC .......................... 324/228, 229, 230, 236–243
See application file for complete search history.

(56) References Cited

FOREIGN PATENT DOCUMENTS

| | | | | |
|---|---|---|---|---|
| JP | H04-331392 | A | | 11/1992 |
| JP | H06213872 | A | * | 8/1994 ............. G01N 27/72 |
| JP | H06-265525 | A | | 9/1994 |
| JP | H07-318535 | A | | 12/1995 |
| JP | H09-304346 | A | | 11/1997 |
| JP | 2803917 | B2 | * | 9/1998 |
| JP | 2002-350403 | A | | 12/2002 |
| JP | 2003-161724 | A | | 6/2003 |
| JP | 2005-214885 | A | | 8/2005 |
| JP | 2006218505 | A | * | 8/2006 ............. G01N 27/83 |
| JP | 2006-234733 | A | | 9/2006 |
| JP | 2017-072508 | A | | 4/2017 |
| JP | 2018-031069 | A | | 3/2018 |
| SU | 1567964 | A1 | | 5/1990 |

OTHER PUBLICATIONS

Toshiyuki et al.; Translation of JP H06213872 A; Aug. 5, 1994; Translated by EPO & Google (Year: 1994).*
Toshiyuki et al.; Translation of JP H06265525 A; Sep. 22, 1994; Translated by EPO & Google (Year: 1994).*
Takahiro et al.; Translation of JP 2006218505 A; Aug. 24, 2006; Translated by EPO & Google (Year: 2006).*
Arai et al.; Translation of JP-2803917-B2; Sep. 24, 1998; Translation by EPO & Google (Year: 1998).*
Apr. 8, 2022 Extended European Search Report issued in European Application No. 20796028.7.
Feb. 11, 2022 Office Action issued in Russian Patent Application No. 2021130560.
"Method of Magneting Particle Testing, Standard Technological Processes," National Board of the Russian Federation, Effective as of Jan. 6, 2016, GOST R 56512-2015.
Jul. 28, 2020 International Search Report issued in International Patent Application No. PCT/JP2020/016877.

* cited by examiner

FIG.2
(a)
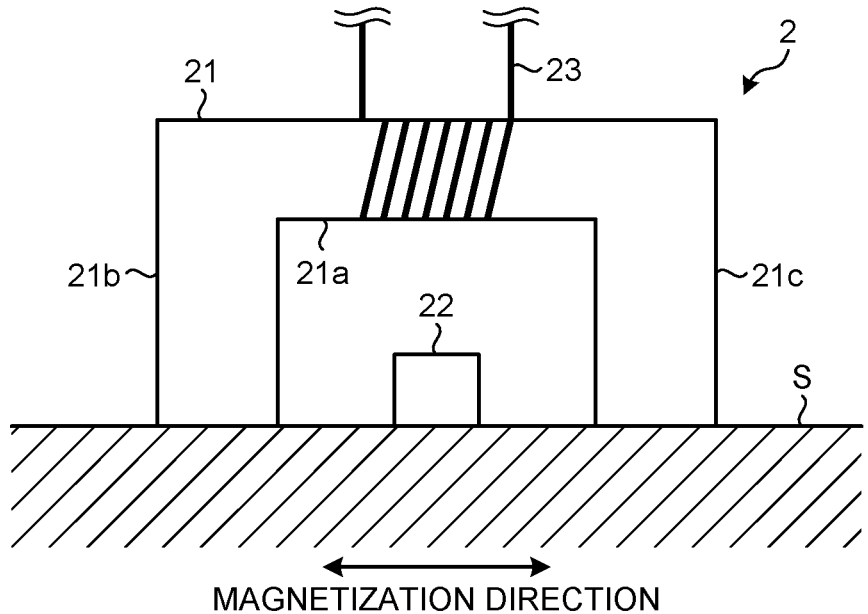
MAGNETIZATION DIRECTION
(b)
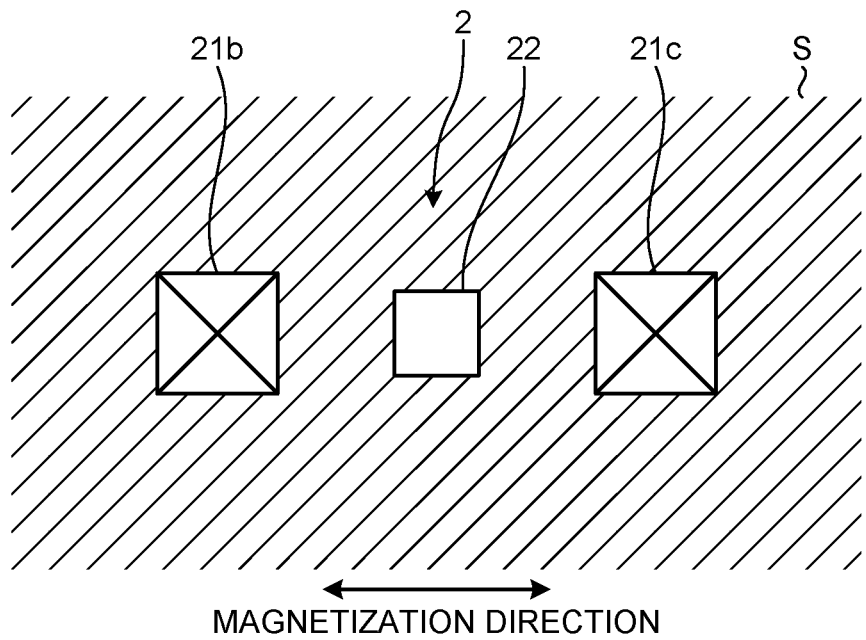
MAGNETIZATION DIRECTION FIG.3
(a)
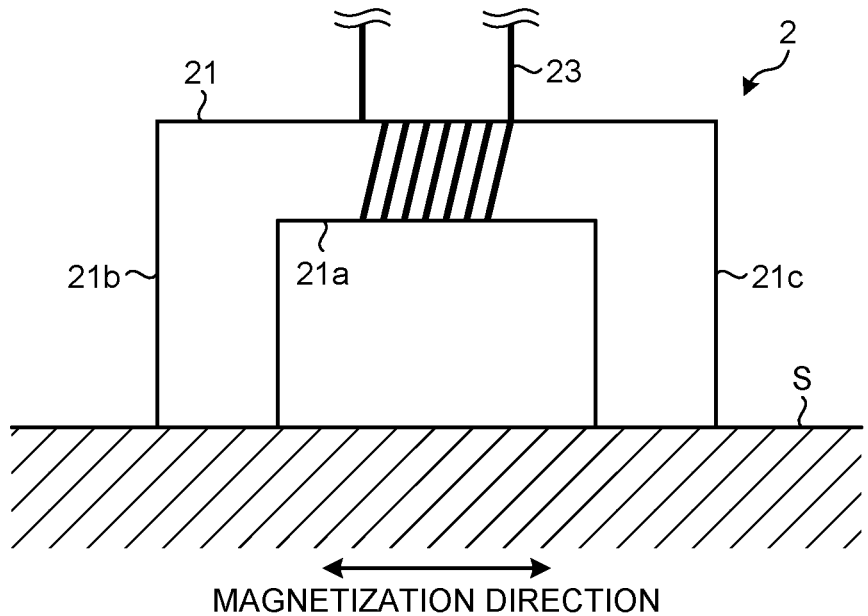
MAGNETIZATION DIRECTION
(b)
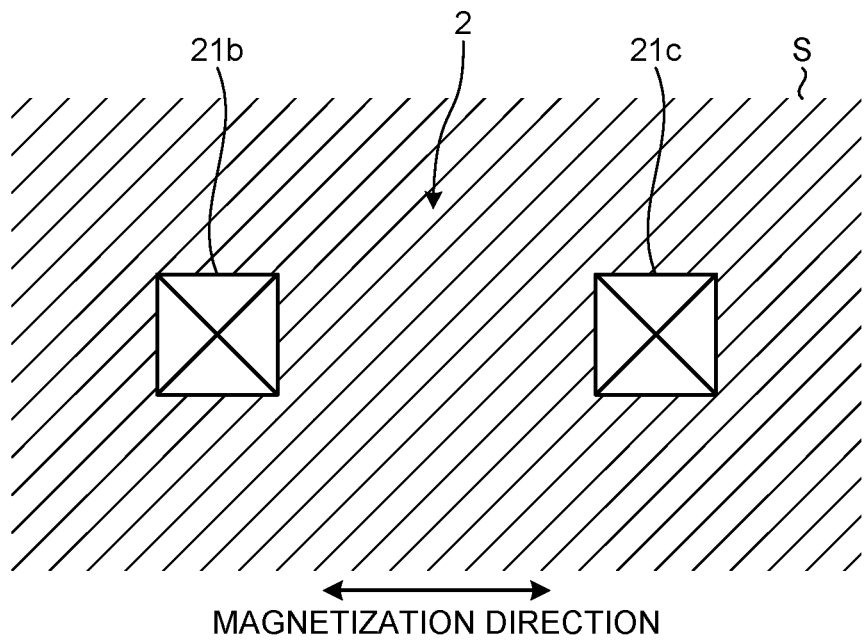
MAGNETIZATION DIRECTION FIG.9
(a)
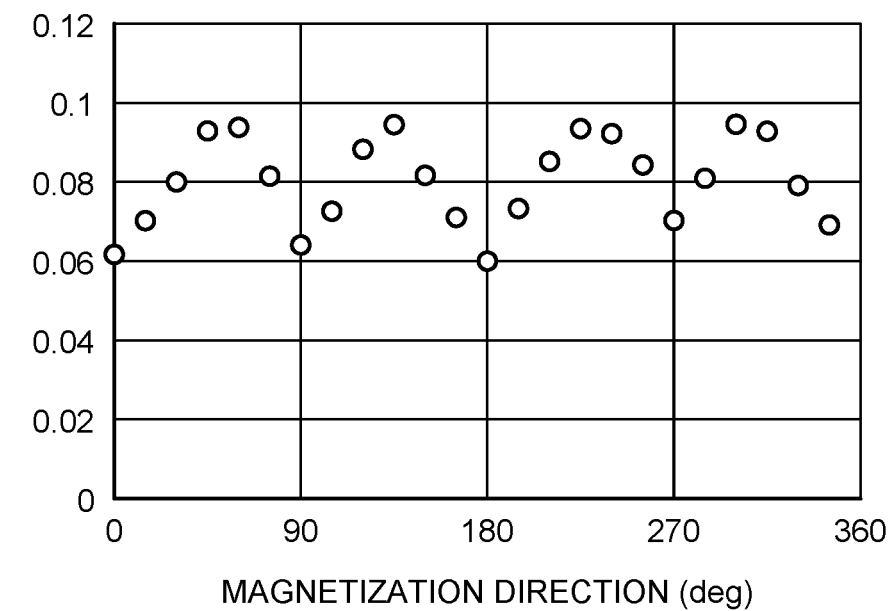
(b)
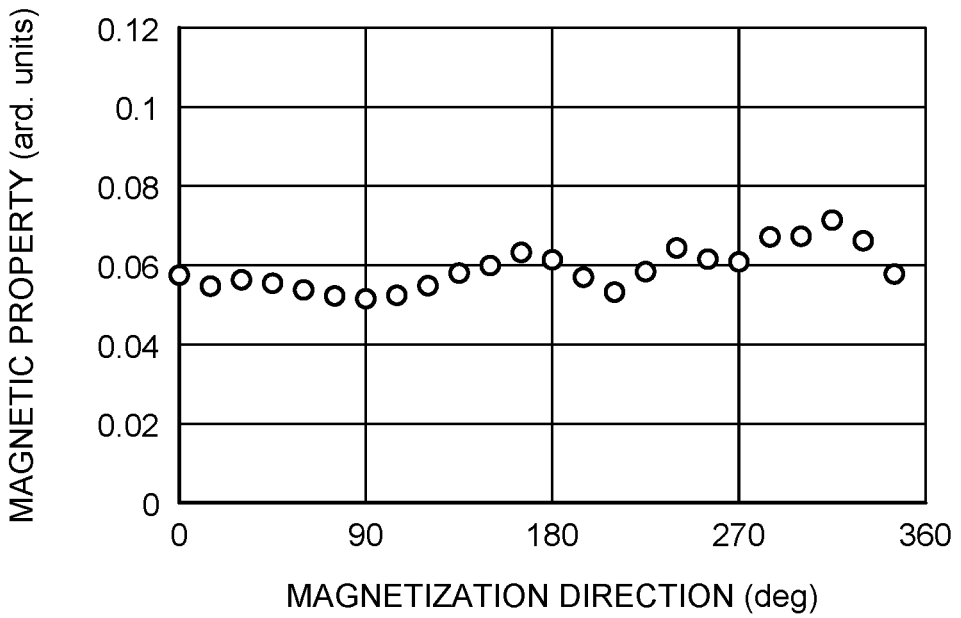

METAL STRUCTURE EVALUATOR FOR ROLLED STEEL SHEETS, METHOD FOR EVALUATING METAL STRUCTURE OF ROLLED STEEL SHEET, PRODUCTION FACILITY OF STEEL PRODUCT, METHOD FOR MANUFACTURING STEEL PRODUCT, AND METHOD OF QUALITY MANAGEMENT OF STEEL PRODUCT

FIELD

The present invention relates to a metal structure evaluator for rolled steel sheets that evaluates the metal structure of a surface layer of a high-strength rolled steel sheet using electromagnetic measurement, a method for evaluating the metal structure of a rolled steel sheet, a manufacturing facility of steel products, a method for manufacturing steel products, and a method of quality management of the steel products.

BACKGROUND

High-strength steel sheets are generally manufactured using a technique called thermo-mechanical control process (TMCP) in which controlled rolling and controlled cooling are combined. In order to increase the strength of a steel sheet by using the TMCP technique, increasing the rate of cooling during controlled cooling is effective. Controlled cooling performed at a high rate of cooling, however, rapidly cools the surface layer of a steel sheet and easily causes variations of the metal structure of the surface layer, compared to the inside of the steel sheet. The metal structure of a surface layer is therefore a key to maintain properties of the steel sheet consistent. For the above background, Patent Literature 1 discloses a method for evaluating the metal structure of a steel sheet. Specifically, the method disclosed in Patent Literature 1 evaluates the processed ferrite fraction based on the electron back scatter diffraction patterns (EBSD) using an electron microscope and evaluates the area ratio of a martensite-austenite mixed layer by observing, with an optical microscope, the conditions after etching using a corrosive liquid.

CITATION LIST

Patent Literature

Patent Literature 1: Japanese Patent Application Laid-open No. 2018-31069

SUMMARY

Technical Problem

The method for evaluating a metal structure using the electron microscope and the optical microscope, as disclosed in Patent Literature 1, is non-real-time evaluation performed by collecting samples. The method therefore has difficulty evaluating the metal structure of a steel sheet as it is, without destroying the sheet.

In view of the problem described above, it is an object of the present invention to provide a metal structure evaluator for rolled steel sheets and a method for evaluating the metal structure of a rolled steel sheet that are capable of non-destructively evaluating the metal structure of a rolled steel sheet. It is another object of the present invention to provide a manufacturing facility of steel products, a method for manufacturing steel products, and a method of quality management of the steel products, which can non-destructively evaluate the metal structure of a steel product and thus can improve the manufacturing yield of the steel product.

Solution to Problem

A metal structure evaluator according to the present invention for rolled steel sheets includes: a magnetic property measuring unit configured to measure a magnetic property of an evaluation target point in at least two or more different magnetization directions by performing, in the at least two or more different magnetization directions, processing of: applying a magnetic field on a surface of a rolled steel sheet in one direction; and measuring a magnetic property of the evaluation target point on the surface of the rolled steel sheet; and a determination unit configured to determine a metal structure of the evaluation target point based on the magnetic property measured by the magnetic property measuring unit.

The determination unit may be configured to calculate a cyclic component for distinguishing the metal structure from a cyclic fluctuation component of the magnetic property in the magnetization direction, and determine the metal structure of the evaluation target point based on the cyclic fluctuation component.

The determination unit may be configured to determine the metal structure of the evaluation target point, based on a difference between magnetic properties of different magnetization directions for judging a range of fluctuation in magnetic property, among magnetic properties of the respective magnetization directions.

The magnetic property measuring unit may include: a probe array including at least two or more probes each of which includes a mechanism configured to apply a magnetic field on the surface of the rolled steel sheet in the one direction, and a mechanism configured to measure a magnetic property of the evaluation target point on the surface of the rolled steel sheet, wherein the two or more probes are arranged to face the respective different magnetization directions; and a moving mechanism configured to move the rolled steel sheet and the probe array relative to each other.

The magnetic property measuring unit may include: a probe array provided for the at least two or more different magnetization directions and including a plurality of probes each of which includes a mechanism configured to apply a magnetic field on the surface of the rolled steel sheet in the one direction, and a mechanism configured to measure a magnetic property of the evaluation target point on the surface of the rolled steel sheet, wherein the probes are arranged in a width direction of the rolled steel sheet; and a moving mechanism configured to move the rolled steel sheet and the probe array relative to each other.

A method for evaluating a metal structure of a rolled steel sheet according to the present invention includes: a magnetic property measuring step of measuring a magnetic property of an evaluation target point in at least two or more different magnetization directions by performing, in the at least two or more different magnetization directions, processing of: applying a magnetic field on a surface of a rolled steel sheet in one direction; and measuring a magnetic property of the evaluation target point on the surface of the rolled steel sheet; and a determining step of determining a metal structure of the evaluation target point based on the magnetic property measured at the magnetic property measuring step.

A manufacturing facility of a steel product according to the present invention includes: a manufacturing facility of the rolled steel sheet; and the metal structure evaluator for rolled steel sheets according to the present invention, wherein the manufacturing facility of the steel product is configured to manufacture the steel product while evaluating the structure of the rolled steel sheet manufactured at the manufacturing facility of the rolled steel sheet using the metal structure evaluator.

A method for manufacturing a steel product according to the present invention includes: a step of manufacturing the steel product while evaluating the metal structure of the steel product using the method for evaluating the metal structure of the rolled steel sheet according to the present invention.

A method of quality management of a steel product according to the present invention includes: a step of managing quality of the steel product by classifying the steel product according to the metal structure of the steel product using the method for evaluating the metal structure of the rolled steel sheet according to the present invention.

Advantageous Effects of Invention

The metal structure evaluator for rolled steel sheets and the method to evaluate the metal structure of a rolled steel sheet according to the present invention can non-destructively evaluate the metal structure of a rolled steel sheet. The manufacturing facility of steel products, the method for manufacturing steel products, and the method of quality management of the steel products according to the present invention can non-destructively evaluate the metal structure of a steel product and thus can improve the manufacturing yield of the steel product.

BRIEF DESCRIPTION OF DRAWINGS

FIG. 2 includes diagrams that illustrate the configuration of a probe illustrated in FIG. 1.

FIG. 3 includes diagrams that illustrate the configuration of a modification of the probe illustrated in FIG. 2.

FIG. 9 includes graphs that indicate example cases in which the magnetic property of a rolled steel sheet is measured in each of magnetization directions.

DESCRIPTION OF EMBODIMENTS

A metal structure evaluator for rolled steel sheets and a method to evaluate the metal structure of a rolled steel sheet as an embodiment of the present invention will now be described with reference to the drawings.

[Configuration]

Figure 1:
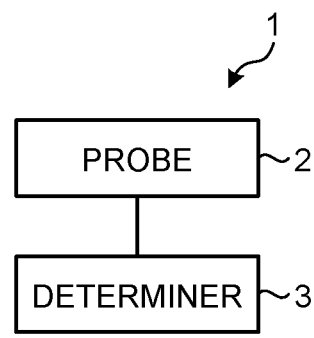
FIG. 1 is a block diagram that illustrates the configuration of a metal structure evaluator for rolled steel sheets as an embodiment of the present invention.

The configuration of the metal structure evaluator for rolled steel sheets as an embodiment of the present invention will now be described with reference to FIG. 1 to FIG. 3. FIG. 1 is a block diagram that illustrates the configuration of the metal structure evaluator for rolled steel sheets as an embodiment of the present invention. FIGS. 2(a) and (b) are a side view and a plan view that illustrate the configuration of a probe 2 illustrated in FIG. 1. FIGS. 3(a) and (b) are a side view and a plan view that illustrate the configuration of a modification of the probe 2 illustrated in FIG. 2.

As illustrated in FIG. 1, a metal structure evaluator 1 for rolled steel sheets as an embodiment of the present invention includes the probe 2 that performs processing of applying a magnetic field on a surface of a rolled steel sheet in a direction and measuring the magnetic property of an evaluation target point on the surface of the rolled steel sheet. This operation is performed for at least two or more different magnetization directions to measure the magnetic property of the evaluation target point in at least two or more different magnetization directions. The metal structure evaluator 1 further includes a determiner 3 that determines the metal structure of the evaluation target point in a size of roughly several to several tens of millimeters, based on the magnetic properties measured by the probe 2.

As illustrated in FIGS. 2(a) and (b), the probe 2 includes a magnetization yoke 21 and a magnetic sensor 22.

The magnetization yoke 21 is a U-shaped member made of a member 21a, and a member 21b and a member 21c extended from respective ends of the member 21a toward the surface of a rolled steel sheet S. An excitation coil 23 is wound around the member 21a. The magnetization yoke 21 applies a magnetic field in a magnetization direction indicated by an arrow, on the surface layer of the rolled steel sheet S by supplying the current to the excitation coil 23.

The magnetic sensor 22 measures magnetic properties of the rolled steel sheet S, subjected to application of a magnetic field by the magnetization yoke 21, and outputs data of the measured magnetic properties to the determiner 3. As illustrated in FIGS. 3(a) and (b), the excitation coil 23 is allowed to be used as the magnetic sensor 22 by detecting a change in current flowing in the excitation coil 23, the change which depends on the magnetic properties of the rolled steel sheet S.

[Method]

Figure 4:
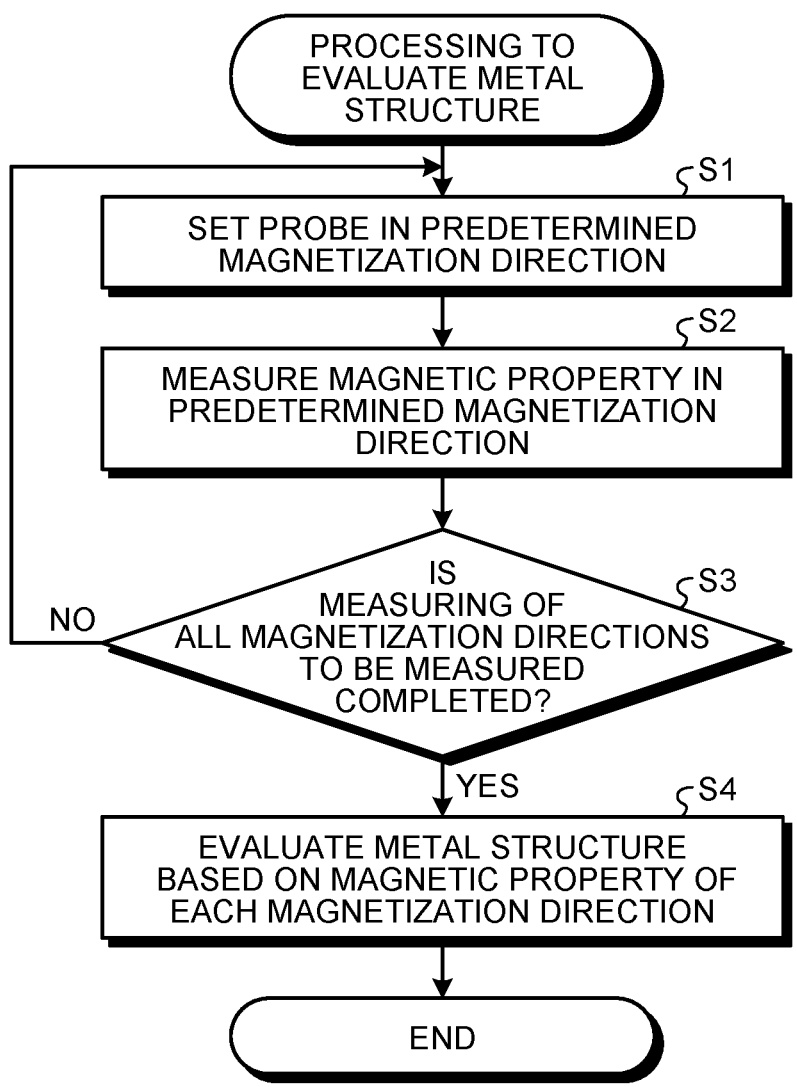
FIG. 4 is a flowchart that illustrates a processing flow of metal structure evaluation for rolled steel sheets, as an embodiment of the present invention.
Figure 5:
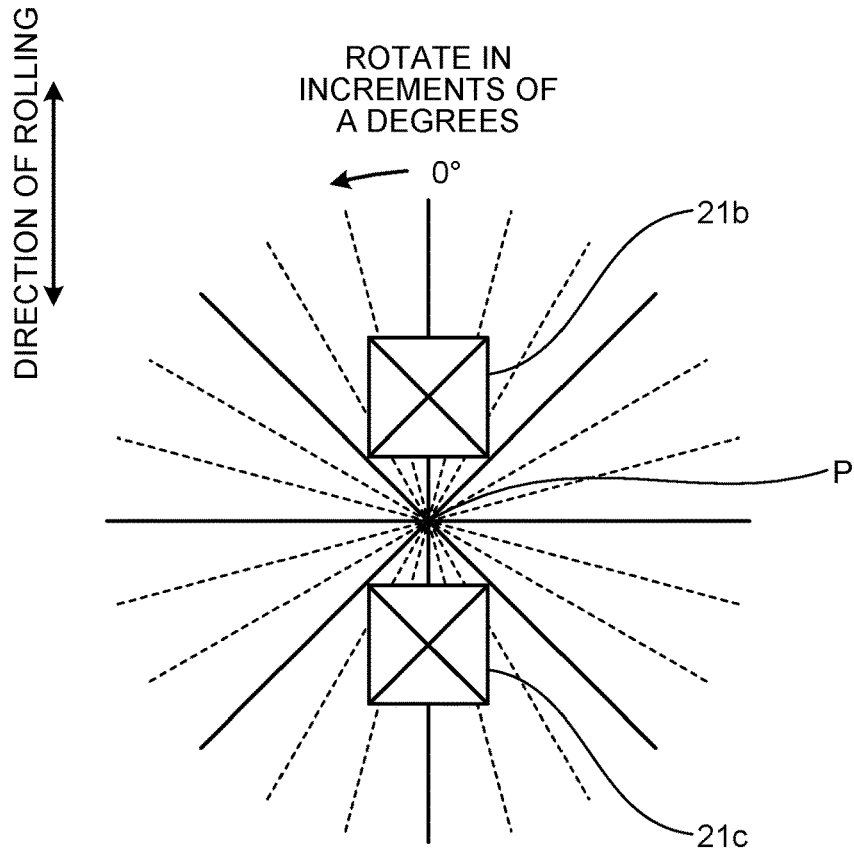
FIG. 5 is a schematic diagram to explain the processing of Steps S1 to S3 illustrated in FIG. 4.

A method to evaluate the metal structure of a rolled steel sheet as an embodiment of the present invention will now be described with reference to FIG. 4 to FIG. 9. FIG. 4 is a flowchart that illustrates a processing flow of metal structure evaluation for rolled steel sheets as an embodiment of the present invention. FIG. 5 is a schematic diagram to explain the processing of Steps S1 to S3 illustrated in FIG. 3.

As illustrated in FIG. 4, the processing to evaluate the metal structure of a rolled steel sheet, as an embodiment of the present invention, sets the probe 2 to apply a magnetic field in a predetermined magnetization direction to the rolled steel sheet S (Step S1), and applies a magnetic field in the predetermined magnetization direction to the rolled steel sheet S and measures magnetic properties (Step S2). It is then determined whether magnetic properties have been completely measured for all the magnetization directions, at least two or more directions, of which magnetic properties are necessary to be measured (Step S3). If measurement is not completed (No at Step S3), the probe 2 is set to apply a magnetic field in a magnetization direction, the magnetic properties of which are yet to be measured. If measurement is completed (Yes at Step S3), the determiner 3 evaluates (determines) the metal structure of the rolled steel sheet S, based on the magnetic property of each magnetization direction measured by the probe 2 (Step S4).

More specifically, the processing of Steps S1 to S3 repeats measuring of magnetic properties while rotating the probe 2 on a horizontal plane in increments of A degrees to change the magnetization direction, with an evaluation target point P on the surface of the rolled steel sheet S kept in the center of the probe 2, as illustrated in FIG. 5. In the measurement of each magnetic property, for example, as the method described in Japanese Translation of PCT International Application Laid-open No. H2-504077, the tangential magnetic field strength and the high frequency component (described later) at each time as magnetic properties are measured while an alternating magnetic field generated by a sinusoidal signal is being applied, and the maximum value and the mean value of the tangential magnetic field strength, the magnetic coercivity, the coefficient of a high frequency component, and other elements are calculated.

The alternating magnetic field is generated by applying a signal where a high frequency sinusoidal signal, specifically, a signal having an amplitude of approximately one to one hundredth of the amplitude of a fundamental low frequency (50 Hz to 500 Hz) sinusoidal signal and having a frequency of approximately one KHz to ten KHz, is superimposed on the fundamental low frequency sinusoidal signal. The above high frequency component is an observation signal for the superimposed high frequency component, among magnetization signals (or current signals observed, if the probe 2 is not used) measured by the probe 2. The tangential magnetic field strength corresponds to the amplitude of this high frequency component.

Figure 6:
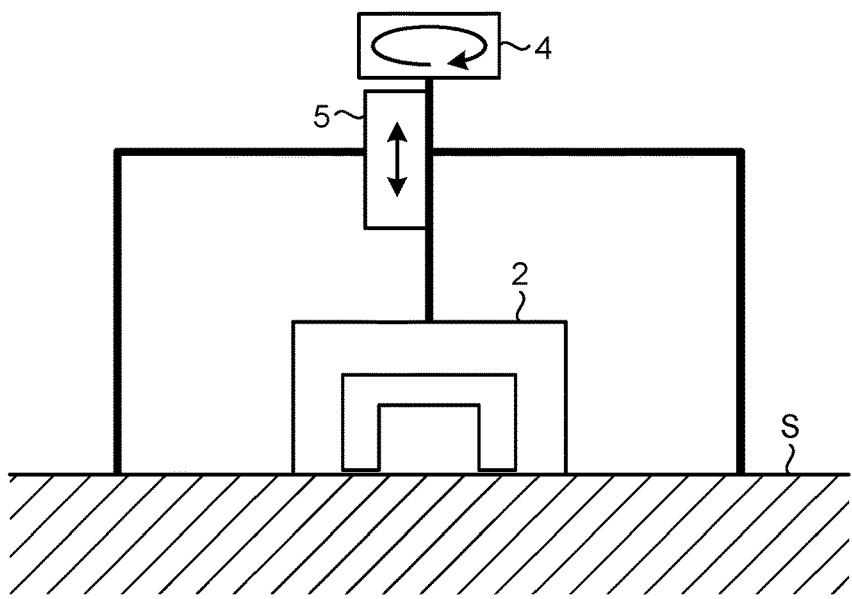
FIG. 6 is a schematic diagram that illustrates the configurations of a rotating mechanism and a lifting mechanism of the probe.
Figure 7:
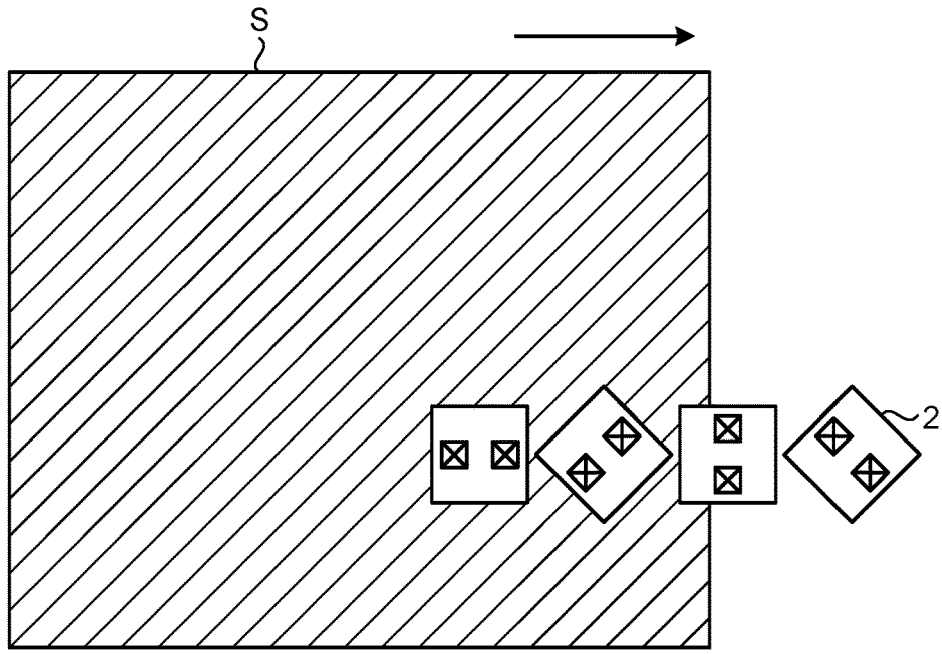
FIG. 7 is a schematic diagram that illustrates an example configuration of a probe array.
Figure 8:
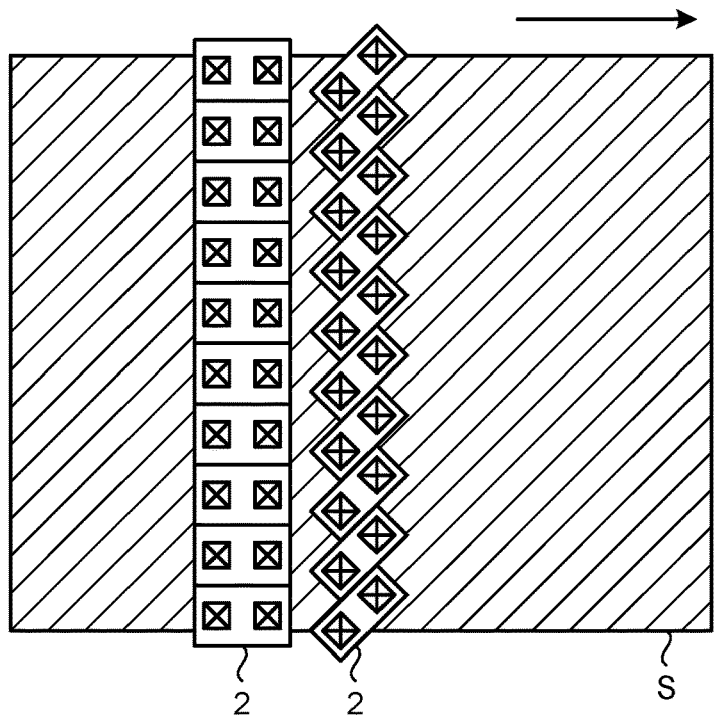
FIG. 8 is a schematic diagram that illustrates example configurations of probe arrays.

At this time, a rotating mechanism 4 to rotate the probe 2 on the horizontal plane and a lifting mechanism 5 to lift the probe 2, as illustrated in FIG. 6, are used to make the probe 2 automatically rotate and magnetized in a predetermined magnetization direction and to measure the magnetic properties. This process may be repeated for predetermined magnetization directions. As another method, as illustrated in FIG. 7, magnetic properties in each magnetization direction may be measured using a probe array where the probes 2 are arranged to face respective magnetization directions to be measured. This method repeatedly measures the magnetic properties while moving the rolled steel sheet S and the probe array relative to each other. As still another method, as illustrated in FIG. 8, magnetic properties in each magnetization direction may be measured using probe arrays arranged to face respective magnetization directions to be measured and including a plurality of probes 2 arranged in the width direction of the rolled steel sheet S. This method repeatedly measures the magnetic properties while moving the rolled steel sheet S and the probe arrays relative to each other.

FIGS. 9(a) and (b) are graphs that indicate example cases in which magnetic properties of rolled steel sheets S having different metal structures are measured in each of magnetization directions, using the same magnetization conditions. In the examples, the magnetization directions are rotated in increments of 15 degrees, such as 0°, 15°, 30°, . . . , 345°. Magnetic properties are therefore measured at every 15 degrees and obtained for 360 degrees. Any angle interval for measurement is selectable, and the intervals are not necessarily to be constant. The examples of FIGS. 9(a) and (b) indicate that dependency of the magnetic property on magnetization direction significantly differs by metal structure. Particularly, in the example of FIG. 9(a), a drastic change is observed at every 90° cycle of the magnetization direction. The changes represent the presence of strong anisotropy. It is therefore preferable to make a measurement at least every 45° to capture these 90° cycle changes. Evaluation may be made for magnetization directions of total 180° or 90°, instead of 360°.

At the processing of Step S4, the determiner 3 determines the anisotropy based on the magnetic property of each magnetization direction measured by the probe 2. In the present embodiment, the determiner 3 evaluates the anisotropy of the magnetic property by calculating a component of Fourier series expansion corresponding to the angle of a magnetization direction. More specifically, the determiner 3 calculates a component $F(P, n)$ indicated by the following expression (1) with the value of the magnetic property, measured at an angle $\theta$ of a magnetization direction, set as $P(\theta)$ and the degree of the Fourier series set as n. In this calculation, for example, the component $F(P, 4)$ where n=4 corresponds to a fluctuation component of the 90° cycle. The determiner 3 determines the metal structure of the evaluation target point P, based on the obtained component $F(P, n)$. The method of determination is determined by previously studying the relation between the magnetic properties of a target material and the metal structure. In the examples of FIGS. 9(a) and (b), the component $F(P, 4)$ is get noticed. Specifically, using a previously set determination threshold $T_{P, 4}$, if the absolute value of the component $F(P, 4)$ is equal to or greater than the determination threshold $T_{P, 4}$, the metal structure of the evaluation target point P is determined to be a metal structure A. If the component $F(P, 4)$ is smaller than the determination threshold $T_{P, 4}$, the metal structure of the evaluation target point P is determined to be a metal structure B. Although an example case using the 90° cycle has been described above, any component other than the 90° cycle may be used, if a given difference is large enough to determine a difference between metal structures. In other words, it is effective to use the strength of a cyclic component obtained at an angle that can differentiate (distinguish) metal structures from each other.

$$F(P, n) = \sum_{\theta} P(\theta) \cdot \cos(n\theta) \quad (1)$$

Such a method is also conceivable that uses a set $\{P(\theta)\}_\theta$ of values of magnetic properties, as indicated in the following expression (2), obtained in the respective magnetization directions, and determines the metal structure by evaluating the range of fluctuation of the value $P(\theta)$. For example, based on calculation of a maximum value maxP and a minimum value minP and calculation of a difference $\Delta P$ between the maximum value maxP and the minimum value minP using the following expression (3), if the difference $\Delta P$ is equal to or greater than a previously set determination threshold $T_{\Delta P}$, the metal structure of the evaluation target point P may be determined to be a metal structure A. If the difference $\Delta P$ is smaller than the previously set determination threshold $T_{\Delta P}$, the metal structure of the evaluation target point P may be determined to be a metal structure B. The difference $\Delta P$ is not limited to a difference between the maximum value maxP and the minimum value minP. Since it is only necessary to evaluate how much the value $P(\theta)$ fluctuates, a difference in the value $P(\theta)$ between specific angles may be evaluated to judge the range of fluctuation of the magnetic property.

$$\{P(\theta)\}_\theta = \{P(\theta_0), P(\theta_1), P(\theta_2), \ldots, P(\theta_{N-1})\} \quad (2)$$

$$\Delta P = \max P - \min P \quad (3)$$

As is apparent from the above description, because dependency of the magnetic property on the magnetization direction differs between metal structures, the metal structure evaluator 1 for rolled steel sheets as an embodiment of the present invention determines the metal structure of the rolled steel sheet S by measuring magnetic properties of at least two or more magnetization directions and calculating dependency of the magnetic property on the magnetization direction. The metal structure evaluator 1 therefore enables nondestructive evaluation of the metal structure of the rolled steel sheet S.

First Example

Figure 10:
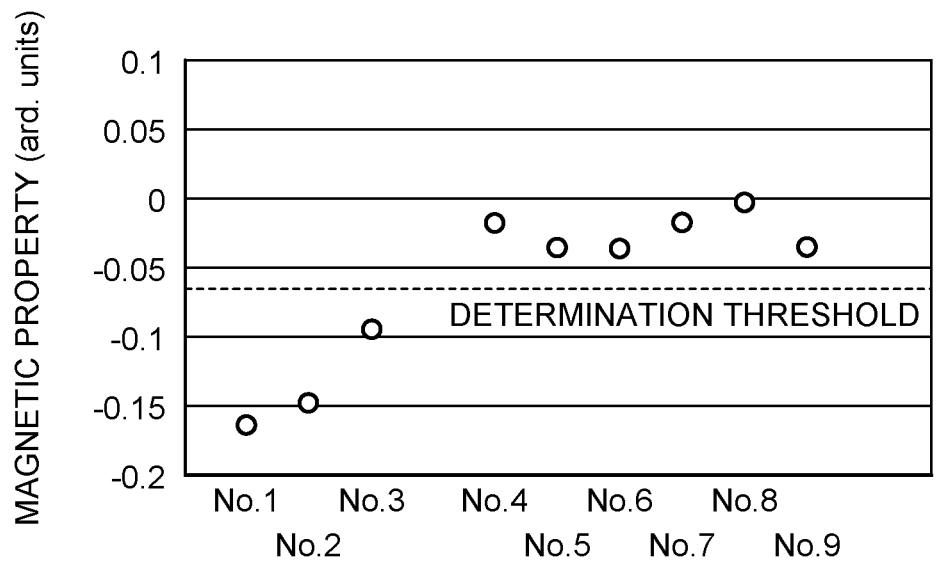
FIG. 10 is a graph that indicates an example case in which the metal structure of a rolled steel sheet is evaluated.

In a first example, a sinusoidal magnetic field of 125 Hz was applied to a steel sheet, and the mean values of tangential magnetic field strength was measured as a magnetic property. Total 24 magnetization directions were set at intervals of 15°, such as 0°, 15°, 30°, . . . ,345°, relative to the direction of rolling. A component (P,4) corresponding to a fluctuation component of the 90° cycle was evaluated. A determination threshold $T_{P,4}$ was given as 0.07. If the absolute value of the component F(P,4) is equal to or less than the determination threshold $T_{P,4}$, the metal structure of the evaluation target point P was determined to be a bainite structure. If the absolute value of the component F(P,4) is larger than the determination threshold $T_{P,4}$, the metal structure of the evaluation target point P was determined to be a ferrite and bainite structure, which is a structure having strong magnetic anisotropy. Corresponding to observation of the above evaluation target point P using a microscope, an adjacent portion of the evaluation target point P was observed to classify the metal structure. Metal structures of respective evaluation target points are indicated in Table 1, and the values of the components F(P, 4) of the evaluation target points are indicated in FIG. 10. As illustrated in FIG. 10, the metal structure can be determined by evaluating dependency of the magnetic property on the magnetization direction.

TABLE 1

| No. | Base Material | Metal Structure |
| --- | --- | --- |
| 1 | A | Ferrite and Bainite |
| 2 | A | Ferrite and Bainite |
| 3 | A | Ferrite and Bainite |
| 4 | B | Bainite |
| 5 | B | Bainite |
| 6 | B | Bainite |
| 7 | C | Bainite |
| 8 | C | Bainite |
| 9 | C | Bainite |

Second Example

Figure 11:
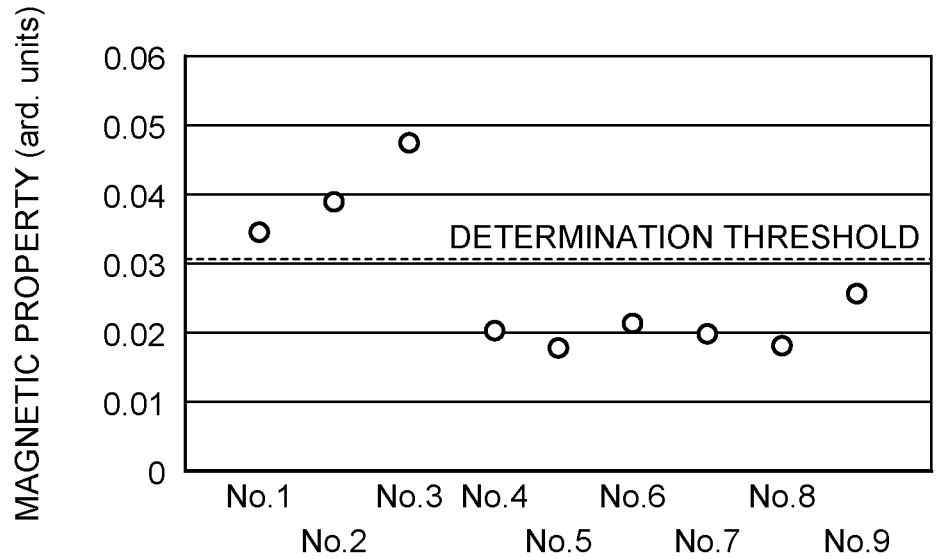
FIG. 11 is a graph that indicates an example case in which the metal structure of a rolled steel sheet is evaluated.

In the second example, using the same target to be measured and the same method of measuring of magnetic properties as the first example, the above difference ΔP was calculated, and the determination threshold $T_{\Delta P}$ was given as 0.03. If the difference ΔP is equal to or greater than the determination threshold $T_{\Delta P}$, the metal structure of the evaluation target point P was determined to be a ferrite and bainite structure. If the difference ΔP is smaller than the determination threshold $T_{\Delta P}$, the metal structure of the evaluation target point P was determined to be a bainite structure. Values of the difference ΔP obtained at respective evaluation target points are illustrated in FIG. 11. As illustrated in FIG. 11, the metal structure can be determined by evaluating dependency of the magnetic property on the magnetization direction.

An embodiment to which the present invention made by the inventors of the present invention is applied has been described. It should be noted that the description and drawings of the embodiment, serving as a part of disclosure of the present invention, are not intended to limit the present invention. For example, the metal structure evaluator 1 for rolled steel sheets as an embodiment of the present invention is installed to a known or unknown manufacturing facility of rolled steel sheets, and a steel product is manufactured while evaluating the metal structure of a rolled steel sheet, manufactured at the manufacturing facility of rolled steel sheets. This configuration can improve the manufacturing yield of the rolled steel sheet. Furthermore, the manufacturing facility of rolled steel sheets equipped with the metal structure evaluator 1 for rolled steel sheets as an embodiment of the present invention is installed to a known or unknown manufacturing facility of steel products. A steel product is manufactured while evaluating the metal structure of a rolled steel sheet, manufactured at the manufacturing facility of rolled steel sheets. This configuration can improve the manufacturing yield of the steel product. A steel product is manufactured while evaluating the metal structure of the steel product (more specifically, the metal structure of a rolled steel sheet being processed to manufacture the steel product or a rolled steel sheet from which the steel product has been manufactured) using the metal structure evaluator 1 for rolled steel sheets and the method to evaluate the metal structure of a rolled steel sheet, as an embodiment of the present invention. This configuration can improve the manufacturing yield of the steel product. Furthermore, the metal structure evaluator 1 for rolled steel sheets and the method to evaluate the metal structure of a rolled steel sheet, as an embodiment of the present invention, are used to classify a steel product according to the metal structure of the steel product (more specifically, the metal structure of a rolled steel sheet being processed to manufacture the steel product or a rolled steel sheet from which the steel product has been manufactured), thereby managing the quality of the steel product. As described above, other embodiments, examples, operational techniques, and the like, that are made by the skilled or other persons based on the present embodiment are all included in the scope of the present invention.

INDUSTRIAL APPLICABILITY

According to the present invention, a metal structure evaluator for rolled steel sheets and a method for evaluating the metal structure of a rolled steel sheet capable of non-destructively evaluating the metal structure of a rolled steel sheet can be provided. According to the present invention, a manufacturing facility of steel products, a method for manufacturing steel products, and a method of quality management of the steel products are provided that can improve manufacturing yield of a steel product by non-destructively evaluating the metal structure of the steel product.

REFERENCE SIGNS LIST

1 METAL STRUCTURE EVALUATOR FOR ROLLED STEEL SHEETS
2 PROBE
3 DETERMINER
4 ROTATING MECHANISM
5 LIFTING MECHANISM
21 MAGNETIZATION YOKE
21a, 21b, 21c MEMBER
22 MAGNETIC SENSOR
23 EXCITATION COIL
P EVALUATION TARGET POINT
S ROLLED STEEL SHEET

The invention claimed is:

1. A metal structure evaluator for rolled steel sheets, the metal structure evaluator comprising:
 a magnetic property measuring unit configured to measure a magnetic property of an evaluation target point in at least two different magnetization directions by performing, in the at least two different magnetization directions, the processes of:
  applying a magnetic field on a surface of a rolled steel sheet in one magnetization direction, and
  measuring a magnetic property of the evaluation target point on the surface of the rolled steel sheet; and
 a determiner configured to determine a metal structure of the evaluation target point based on the magnetic property measured by the magnetic property measuring unit,
 wherein the determiner is configured to:
  calculate a cyclic fluctuation component for distinguishing the metal structure from the cyclic fluctuation component of the magnetic property in the magnetization direction, and
  determine the metal structure of the evaluation target point based on the cyclic fluctuation component.

2. The metal structure evaluator for rolled steel sheets according to claim 1, wherein the magnetic property measuring unit includes:
 a probe array including at least two probes each of which includes:
  a magnetic field application mechanism configured to apply a magnetic field on the surface of the rolled steel sheet in the one direction, and
  a magnetic property measurement mechanism configured to measure a magnetic property of the evaluation target point on the surface of the rolled steel sheet,
 wherein the at least two probes are arranged to face the respective different magnetization directions; and
 a moving mechanism configured to move the rolled steel sheet and the probe array relative to each other.

3. The metal structure evaluator for rolled steel sheets according to claim 1, wherein the magnetic property measuring unit includes:
 a probe array provided for the at least two different magnetization directions and including a plurality of probes each of which includes:
  a magnetic field application mechanism configured to apply a magnetic field on the surface of the rolled steel sheet in the one direction, and
  a magnetic property measurement mechanism configured to measure a magnetic property of the evaluation target point on the surface of the rolled steel sheet,
 wherein the probes are arranged in a width direction of the rolled steel sheet; and
 a moving mechanism configured to move the rolled steel sheet and the probe array relative to each other.

4. A manufacturing facility of a steel product, the manufacturing facility comprising:
 a manufacturing facility of the rolled steel sheet; and
 the metal structure evaluator for rolled steel sheets according to claim 1,
 wherein the manufacturing facility of the steel product is configured to manufacture the steel product while evaluating the structure of the rolled steel sheet manufactured at the manufacturing facility of the rolled steel sheet using the metal structure evaluator.

5. A method for evaluating a metal structure of a rolled steel sheet, the method comprising:
 a magnetic property measuring step of measuring a magnetic property of an evaluation target point in at least two different magnetization directions by performing, in the at least two different magnetization directions, the processes of:
  applying a magnetic field on a surface of a rolled steel sheet in one magnetization direction, and
  measuring a magnetic property of the evaluation target point on the surface of the rolled steel sheet; and
 a determining step of determining a metal structure of the evaluation target point based on the magnetic property measured at the magnetic property measuring step,
 wherein the determining step includes:
  calculating a cyclic fluctuation component for distinguishing the metal structure from the cyclic fluctuation component of the magnetic property in the magnetization direction, and
  determining the metal structure of the evaluation target point based on the cyclic fluctuation component.

6. A method for manufacturing a steel product, the method comprising:
 a step of manufacturing the steel product while evaluating the metal structure of the steel product using the method for evaluating the metal structure of the rolled steel sheet according to claim 5.

7. A method of quality management of a steel product, the method comprising:
 a step of managing quality of the steel product by classifying the steel product according to the metal structure of the steel product using the method for evaluating the metal structure of the rolled steel sheet according to claim 5.

* * * * *